UNITED STATES PATENT OFFICE.

THOMAS P. MILLIGAN, OF SOUTH ORANGE, AND ISAIAH DENNIS, OF NEWARK, NEW JERSEY; SAID DENNIS ASSIGNOR TO SAID MILLIGAN.

PROCESS OF PREPARING THE SKINS OF SMALL ANIMALS FOR THE MANUFACTURE OF GELATINE.

SPECIFICATION forming part of Letters Patent No. 246,182, dated August 23, 1881.

Application filed June 14, 1881. (No specimens.)

*To all whom it may concern:*

Be it known that we, THOS. P. MILLIGAN and ISAIAH DENNIS, citizens of the United States, residing, respectively, at South Orange and Newark, both in Essex county, New Jersey, have invented certain new and useful Improvements in Processes of Preparing the Skins of Small Animals for the Manufacture of Gelatine, fully described in the following specification.

Our invention relates to an improvement in the manufacture of gelatine; and it consists, first, in a peculiar mode of treating the skins of the cony, rabbit, hare, nutria, muskrat, and similar small animals, whose pelts are treated with nitrate of mercury, or "caroted," as it is commonly termed, to prepare the fur thereon for felting, with a solution of soda or soda and lime, to neutralize the effects of the chemicals in the skins, and to remove all foreign substances from the gelatinous element; secondly, in treating the gelatinous material thus obtained with a solution of alum to harden the stock before boiling.

The class of skins to which our invention relates are usually shredded into strips for the convenient removal of the fur for use in hat-manufacture, and are usually very thin and tender when soaked in water, the solution containing a large amount of acid, and the gelatinous products being very milky in appearance and liable to turn brown. For this reason they have never been used in the manufacture of gelatine, which requires to be perfectly clear and free from foreign ingredients. The delicate nature of the skins does, however, fit them to afford a very fine and clear gelatine under proper treatment; and the object of our invention is to effectually remove all objectionable ingredients from the stock, and to remove the liability to discolor in cooking to extract the product from the stock.

The best method of practicing our invention will be first described, and the essential features thereof then pointed out.

For two hundred and fifty pounds of the dry shredded pelts or stock we take about four hundred gallons of water in a large vessel and wash the stock as clean as the water will make it. The dirty water is then drained off and about two hundred gallons of water poured on and mixed with the softened skins. Into this mixture is then stirred a solution of five pounds of soda and ten ounces of lime in two and a half gallons of water. As this is mixed with the softened pelts, the entire mass becomes milky and dirty, and the skins become very much swollen and softened. The soda is permitted to act upon them as long as they will bear the treatment without dissolving or disintegration, the time varying from twenty to sixty minutes with different kinds of stock, and the soda solution and dirty fluid are then carefully drained off and three hundred to four hundred gallons of clean water stirred with the skins to fit them for hardening. This latter operation is effected as follows: After washing out the soda from the skins, they are again drained off, and two or three hundred gallons of water is poured upon them, containing about five pounds of alum in solution. When stirred with this the skins lose the swelled character imparted to them by the soda, and after draining off the alum solution are ready to be heated in the manner usual in extracting the gelatine. When properly boiled they yield the very finest and clearest quality of gelatine, free from every objectionable quality either in substance or appearance.

As stated above, the operations described are such as are employed in securing the finest product from the peculiarly-impregnated stock employed; but the various washings with water may be omitted without affecting the result greatly, as it is the action of the soda and lime chiefly which neutralizes the ingredients that injure the color and cooking qualities of the stock. The action of the soda alone, without either the lime or the alum, will enable the stock to stand the cooking without turning brown; but the solved gelatine is turbid or milky, and the product very inferior to what can be produced from the same stock by the use of all the steps in the process detailed above.

We do not, therefore, limit ourselves to the use of all the agents as employed to produce the best results, as the soda is the essential agent in making the caroted skins available for the manufacture of gelatine, and we therefore regard the gelatine produced by the action of soda upon caroted fur pelts as a new and valuable article.

Having thus plainly set forth our invention, we claim the same as follows:

1. The process herein described for preparing caroted fur pelts, as the skins of the cony, hare, nutria, muskrat, rabbit, and similar small animals, for the manufacture of gelatine, which consists in washing the skins in a solution of caustic soda until the foreign ingredients are removed.

2. In processes for treating the caroted skins of small animals for the manufacture of gelatine, the use of soda and lime in solution, about in the proportions set forth.

3. The method of treating the caroted skins of small animals for the manufacture of gelatine, which consists in soaking the skins soft in water, washing them in a solution of soda and lime, in about the proportions set forth, washing out the soda solution from the skins, and stirring them with a solution of alum, in about the proportions set forth, and for the purpose described.

In testimony whereof we have hereunto set our hands in presence of two subscribing witnesses.

THOS. P. MILLIGAN.
ISAIAH DENNIS.

Witnesses:
THOS. S. CRANE,
DEWEY A. WHITEHEAD.